Patented Apr. 2, 1946

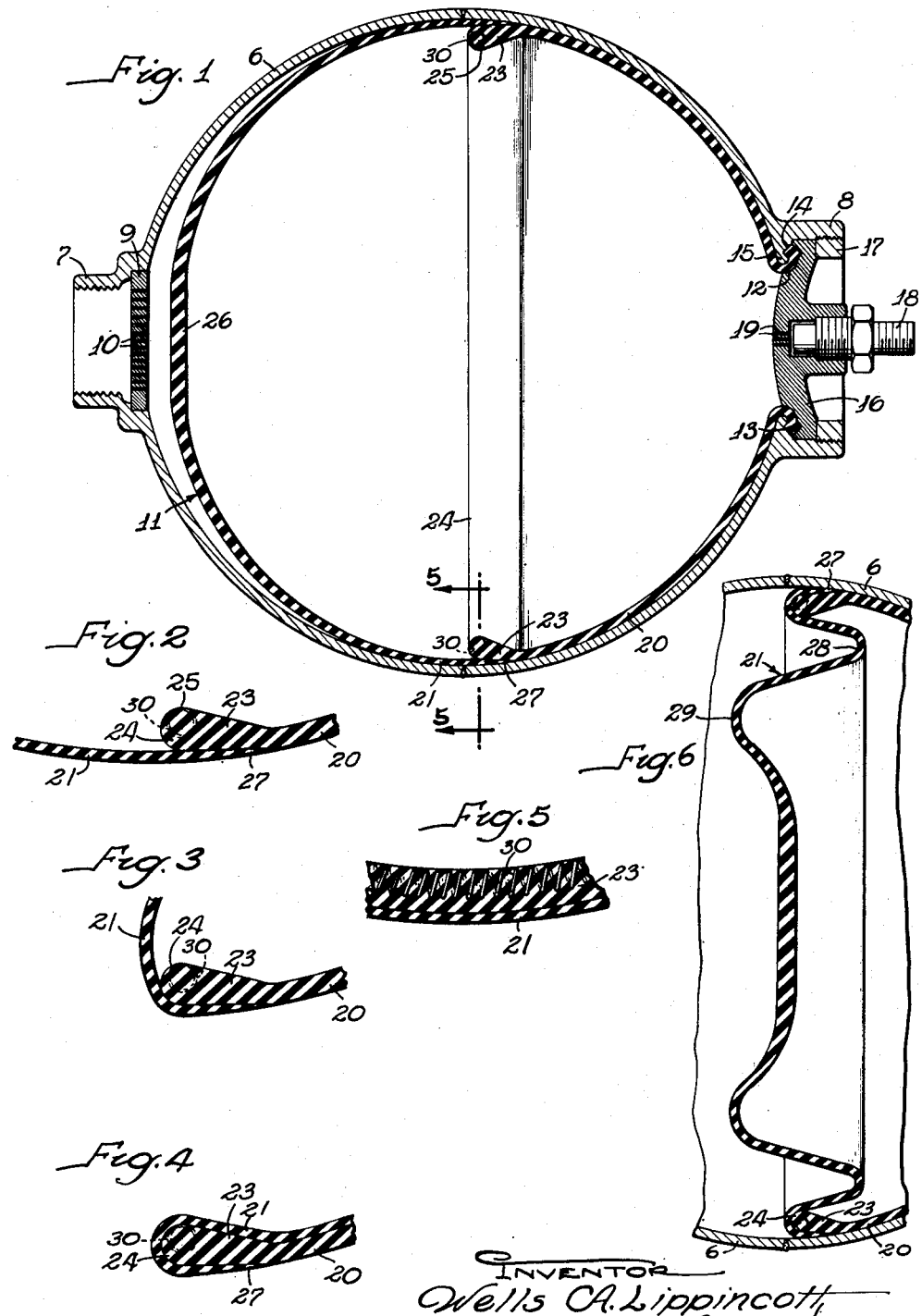

2,397,796

UNITED STATES PATENT OFFICE 2,397,796

ACCUMULATOR

Wells A. Lippincott, Evanston, Ill., assignor to Ideal Roller & Manufacturing Company, Chicago, Ill., a corporation of Illinois Application February 20, 1943, Serial No. 476,561

9 Claims. (Cl. 138—30)

This invention relates to hydraulic accumulators comprising a rigid container and a flexible diaphragm or bladder therein composed of oil resisting rubber material or the like and separating a body of hydraulic fluid from a body of compressed air by which the fluid is maintained under pressure. In such accumulators, the bladder may be expanded into full contact with the interior of the container or collapsed against one end when the container is substantially filled with liquid.

The primary object of the present invention is to provide a bladder which will withstand such usage at extremely low temperatures in aircraft operations.

A more detailed object is to provide a novel bladder construction which will flex through the extreme range above referred to without bending sharply at any point and without substantial stretching.

Another object is to provide a bladder construction which will permit operation of the accumulator without breakage even at temperatures below that at which the bladder material loses its resiliency and becomes a rigid solid.

The invention also resides in the novel construction of the bladder by which the foregoing objects are attained.

Other objects and advantages of the invention will become apparent from the following detailed description taken in connection with the accompanying drawing, in which Figure 1 is a longitudinal sectional view of an accumulator embodying the present invention.

Figs. 2, 3, and 4 are fragmentary sectional views of part of the accumulator bladder.

Fig. 5 is a section taken along the line 5—5 of Fig. 1.

Fig. 6 is a fragmentary view similar to Fig. 1 illustrating another modification.

In the drawing, the invention is incorporated for purposes of illustration in an accumulator including a rigid container or tank 6 which may be generally cylindrical or spherical as shown. Flanges 7 and 8 are integral with the tank and project from opposite ends thereof. The flange 7 is threaded internally for connection to a pipe through which hydraulic fluid may flow to and from the container. A plate 9 having perforations 10 therethrough is seated in the flange flush with the internal tank surface. The other flange 8 is smaller in diameter than the container 6 in order to minimize the total pressure applied to the closure in service use. This flange defines an opening which is large enough to permit the insertion therethrough of a diaphragm or bladder 11 when the latter is collapsed compactly.

The bladder is only slightly smaller than the container 6 and is of the same generally spherical shape so that it may, with very little stretching, expand into full contact with the internal surface of the container. It is relatively thin walled and composed of molded oil resistant rubber or the like having relatively high tensile strength. At one end, the bladder has a neck 12 terminating in an annular bead 13 which, in the present instance, is seated in an external groove 14 in an inturned flange 15. The bead is clamped against the flange by a fitting 16 received in the flange 8 and pressed inwardly by a ring 17 screwed into the flange 8. Air is admitted to the bladder through a stem 18 having a suitable check valve and threaded into an opening in the fitting 16, the opening communicating with the interior of the container through perforations 19. The neck 12 is molded to the shape shown and hooked around the flange 15. Instead of employing the sealing ring 14, the valve end of the bladder may, if desired, be attached directly to the stem 18 which then would be anchored in the container. The bladder, in such a case, would be inserted through the flange 7.

In the form shown in Figs. 1 to 5, the bladder or bag 11 is composed of two molded half spheres or cups 20 and 21 overlapping each other at their open ends and secured together. The neck 12 is formed on the cup 20 which preferably increases progressively in thickness from approximately .050 of an inch adjacent the neck 12 to about .080 near the open end of the cup. Preferably, this cup has a depth somewhat less than the cup 21 and is made of somewhat harder material. Also, it is substantially the same size as the neck end of the container so that after insertion of the bladder, the cup 20 lies in full contact with the internal surface of the container as shown in Fig. 1 irrespective of the amount of liquid in the container.

Near the lip of the cup, the wall increases progressively and more rapidly in thickness as indicated at 23 and merges with a continuous annular rib 24 which has a generally circular end surface 25 with a radius of approximately ⅛ of an inch. This surface faces endwise and extends over approximately 180 degrees so that the inner and outer surfaces of the thickened portion 23 are substantially tangential thereto.

The other cup 21 constitutes the diaphragm proper and moves into and out of the cup 20 as liquid is forced into and drawn out of the accumulator. Preferably it is made somewhat more flexible than the cup 20 and for purposes to appear later, increases in thickness progressively and uniformly from the open to the closed end of the cup. This increase is as small as it is practical to form by molding, the thickness being approximately .065 of an inch at the open end of the cup and .080 adjacent the thickened bottom 26 so that the rate of increase in thickness will overcome any inaccuracies in the mold in which the bladder is formed. That is to say, at any point, the thickness of the bladder wall is greater than at any other point between the first point and the bead 23.

The lip of the cup 21 tapers substantially to a feather edge 27 which projects beyond the rib 24 and overlaps the external surface of the cup 20 along substantially the entire tapered portion 23 of the latter. The overlapping surfaces of the two cups are cemented together to complete the bladder and form a smooth external surface. The rib 24, it will be observed, is thus disposed inside of the bladder and serves not only to strengthen the joint between the two cups, but defines a constant minimum radius around which the adjacent portion of the cup 21 is bent when the bladder is collapsed, that is, when the closed end of the bladder is forced through the rib and into the cup 20. Thus, the wall of the cup 21 may extend partially around the rib 24 as shown in Fig. 3, or the cup may be fully collapsed against the interior of the cup 20 (Fig. 4). Sharp bending of the cup wall at any point and during any degree of collapse of the bladder is thus avoided. Since the cup 21 is shallower than the cup 20, complete collapse of the bladder within the container may take place without bending the lip of the cup 20 inwardly.

While it is preferred to mold the cup 21 to a hemispherical shape, other shapes may be employed. One such form is shown in Fig. 6 in which the peripheral portion of the cup extends around the rib 24 to a reverse bend 28 and a second bend 29, the center portion being somewhat dished. A diaphragm of this shape will, of course, flex in either direction and come into full contact either with the fluid end of the container or with the interior of the cup 20.

Provision is made for maintaining the approximate shape of the cup 20 at all times so that collapsing of the bladder will always take place in an orderly way without wrinkling, wadding or otherwise sharply bending any part of the rubber wall structure of either cup. For this purpose, the rib 24 is reinforced by means which is capable of being collapsed to permit insertion of the bladder through the flange 15 and which is sufficiently resilient to expand the rib within the container and maintains the cup 20 of a generally semi-spherical shape even under the buoyant forces to which the cup 21 may be subjected. In addition to being flexible, the reinforcing means preferably is elastic and of such construction that it will retain the position in which it is initially supported in the mold.

The reinforcing means may take numerous different forms. In the present instance, it comprises a resilient wire 30 wound loosely into a helical coil of smaller diameter than the cross section of the rib 24 and bent into an annulus and embedded in the rib in the molding. The rubber material in the plastic state flows in between the wire convolutions so that the coil thus becomes embedded although it may be exposed on the side which contacts the supporting part of the mold groove. With the coil thus constructed, the rib and the bladder as a whole may be compacted for insertion into the container and then, by virtue of the resiliency of the coil, the rib expands within the container causing the cup 20 to be expanded and thus located in a definite position as shown. By virtue of its elasticity, the coil will expand to permit ready removal of the cup 20 from the mold.

Also, the rib thus reinforced controls the manner of collapse of the bladder which may take place by turning of the cup 21 inside out through the rib. In this movement from the expanded position shown in Figs. 1 and 2, the cup wall initially bends around the rib as shown in Fig. 3 and the center portion flexes but does not wrinkle or become bent sharply. When the container is substantially filled with liquid, the rib 24 will be encircled completely as shown in Fig. 4 and the wall of the cup 21 may lie against the interior of the cup 20.

Reverse bending of the cup 21 takes place as fluid is withdrawn from the accumulator. The cup moves back through the rib 24 and assumes the shape and position shown in Fig. 1 as the fluid is nearly exhausted. As the bladder expands, the cup contacts the interior of the container progressively along the container wall to the fluid outlet end. Such progressive contact avoids the possibility of liquid becoming trapped between the bladder and the container thereby providing for maximum volumetric efficiency of the accumulator.

The accumulator construction above described is adapted to operate with optimum volumetric efficiency at substantially lower temperatures than the accumulators heretofore produced, including temperatures well below that at which the most satisfactory rubber materials that are available will lose resiliency and become substantially rigid. This desirable behavior is based on my discovery that the rubber material will, after such freezing, flex to some degree when stressed internally, such flexure occurring where the wall material is under the greatest unit stress.

The present invention utilizes this characteristic in combination with the progressively tapering wall structure above described to insure contact of the bladder along the container wall progressively from the rib 24 toward the bottom of the cup 21 as the bladder expands during the withdrawal of liquid from the accumulator. For example, if the bladder material is frozen substantially rigid in the shape shown in Fig. 1 and expansion is initiated, flexure will first take place around the circular section of the cup 21 immediately adjacent the last circle of contact with the container wall. This is for the reason that the wall material is under greatest unit stress at this point owing to the fact that the wall is thinnest there. As a result of such stressing, this part of the wall thaws out and flexes into full contact with the container wall whereupon the unit stress therein is reduced and the circle of greatest unit stress is shifted to the adjacent portion of the cup 21 in turn causing this to thaw out and come against its corresponding part of the container wall. Such thawing, expansion, and refreezing occur at successive points progressing along the cup 21 toward the bottom of the latter. Thus, by increasing the wall thickness progressively from the rib 24 toward the bottom of the cup 21, contacting of the container wall occurs progressively toward the unsupported end of the bladder even under the extreme temperature conditions mentioned above with the result that there is no possible danger of trapping liquid between the container and the bladder as the latter is inflated.

I claim as my invention:

1. An accumulator having, in combination, a rigid container having openings at opposite ends, a cup of molded flexible material disposed within said container and attached to one end in communication with one of said openings, an inturned annular rib of rounded cross-section molded around said cup at the open end thereof, and a second cup of molded flexible material disposed within said container and having its open end overlapping said rib externally thereof and secured thereto.

2. In an accumulator of the character described, a diaphragm comprising two separately molded semi-spherical shells of flexible material overlapping each other and secured together at their open ends to form a generally spherical diaphragm, one of said shells having an air inlet axially alined with the joint between the two shells, an annular rib of rounded cross-section molded integral with and extending around the open end of one of said shells interiorly thereof to define a minimum radius of bending of the other shell into the ribbed shell, and a helical coil of wire embedded in said rib throughout the length of the latter.

3. In an accumulator of the character described, a diaphragm comprising a molded bag of flexible material having an opening at one end, a rib molded integral with and extending around the interior of said bag approximately midway between the ends thereof, and a helically wound coil of wire forming an annulus embedded in said rib.

4. In an accumulator of the character described, a diaphragm comprising a molded semi-spherical cup of flexible material having a thickened lip with a rounded surface extending around the end of the lip substantially into tangency with the inner and outer surfaces of the cup, and a second cup of flexible material arranged with its open end overlapping the end of said first cup and cemented thereto, said rounded surface defining a minimum radius of bending for said second cup in all positions of the latter relative to said first cup.

5. A diaphragm for accumulators comprising a molded bag of flexible material having an opening at one end, a rib integral with and extending around the internal surface of the bag approximately midway between the ends thereof, and a piece of resilient wire substantially longer than said rib and bent laterally of its length to form an annulus having a circumferential length approximately equal to that of the rib, said bent wire annulus being embedded in said rib and tending to maintain the rib of circular form while permitting collapse of the bag.

6. A diaphragm for accumulators comprising a molded bag of flexible material having an opening at one end, a rib integral with and extending around the internal surface of the bag approximately midway between the ends thereof, and a piece of resilient wire substantially longer than said rib and bent laterally of its length to form a longitudinally extensible and contractible annulus of a length approximately equal to the circumference of the rib, said bent wire annulus being molded in said rib and held thereby against extension and contraction but adapted to permit collapse of the bag.

7. A diaphragm for an accumulator comprising a bladder having a generally round transverse cross section, said bladder having an internal annular bead to provide a radius of bend when said bladder is folded upon itself, and continuous coiled spring means reinforcing said annular bead to prevent collapse of same.

8. A bladder type accumulator comprising a shell having a hydraulic opening, a flexible bladder secured in said shell, means to apply a gas to one side of said bladder, the other side being adapted to contact liquid admitted by the hydraulic opening, said bladder having a stationary portion and a flexible portion which is adapted to telescope into said stationary portion, an internal bead on said bladder substantially at the line of juncture of the two portions so that an appreciable radius of bend will be present when the portions are telescoped, and a continuous coiled spring reinforcing means at said bead to cause the bladder to maintain its shape so that folding will occur only at the juncture of the portions.

9. A diaphragm for an accumulator comprising a bladder molded of resilient material, a bead extending around the interior of said bladder to provide a radius of bend when said bladder is folded upon itself, said bead being molded integral with the bladder, and a reinforcing member embedded in said bead during molding of the latter and extending around the bead, said reinforcing member having its inner surface exposed on the inner side of said bead.

WELLS A. LIPPINCOTT.